United States Patent
Verbauwhede et al.

(10) Patent No.: US 8,947,123 B2
(45) Date of Patent: Feb. 3, 2015

(54) WAVE DYNAMIC DIFFERENTIAL LOGIC

(71) Applicant: The Regents of the University of California, Oakland, CA (US)

(72) Inventors: Ingrid Verbauwhede, Santa Monica, CA (US); Kris J. V. Tiri, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 236 days.

(21) Appl. No.: 13/691,398

(22) Filed: Nov. 30, 2012

(65) Prior Publication Data
US 2013/0120024 A1 May 16, 2013

Related U.S. Application Data

(60) Continuation of application No. 13/050,317, filed on Mar. 17, 2011, now Pat. No. 8,324,937, which is a division of application No. 10/586,846, filed as application No. PCT/US2005/004877 on Feb. 11, 2005, now Pat. No. 7,924,057.

(60) Provisional application No. 60/544,809, filed on Feb. 13, 2004, provisional application No. 60/613,059, filed on Sep. 24, 2004.

(51) Int. Cl.
| | | |
|---|---|---|
| *H03K 19/00* | (2006.01) | |
| *H03K 19/20* | (2006.01) | |
| *G06F 17/50* | (2006.01) | |
| *G06F 7/00* | (2006.01) | |
| *H04L 9/00* | (2006.01) | |

(52) U.S. Cl.
CPC ............. *G06F 17/5077* (2013.01); *G06F 7/00* (2013.01); *H04L 9/003* (2013.01); *G06F 2207/7266* (2013.01); *H04L 2209/125* (2013.01)

USPC .............................. 326/93; 326/104; 327/200

(58) Field of Classification Search
None
See application file for complete search history.

(56) References Cited

U.S. PATENT DOCUMENTS

| | | | |
|---|---|---|---|
| 6,077,309 A | 6/2000 | Lin | |
| 6,265,923 B1 | 7/2001 | Amir et al. | |
| 6,329,846 B1 | 12/2001 | Davies et al. | |
| 6,437,604 B1 | 8/2002 | Forbes | |
| 6,573,775 B2 | 6/2003 | Pilling | |
| 6,642,763 B2 | 11/2003 | Dike | |
| 6,717,448 B2 | 4/2004 | Heo et al. | |
| 6,725,433 B1 | 4/2004 | Hau-Riege et al. | |

(Continued)

FOREIGN PATENT DOCUMENTS

| | | |
|---|---|---|
| EP | 0921639 | 6/1999 |

OTHER PUBLICATIONS

International Search Report from PCT/US2005/004877, Issued Apr. 10, 2006, in 7 pages.

(Continued)

*Primary Examiner* — Jany Richardson
(74) *Attorney, Agent, or Firm* — Knobbe Martens Olson & Bear LLP

(57) ABSTRACT

Wave Dynamic Differential Logic (WDDL) is provided, wherein a differential logic stage is pre-charged or pre-discharged by a previous logic stage, such as, for example, a previous SDDL stage, a WDDL stage, etc. In one embodiment, a Divided Wave Dynamic Differential Logic (DWDDL) is provided wherein a WDDL circuit is conveniently implemented as dual logic trees.

24 Claims, 14 Drawing Sheets

(56) References Cited

U.S. PATENT DOCUMENTS

| | | |
|---|---|---|
| 6,743,985 B1 | 6/2004 | Greim et al. |
| 6,983,434 B1 | 1/2006 | Frank et al. |
| 7,002,374 B2 | 2/2006 | Anderson et al. |
| 7,417,468 B2 | 8/2008 | Verbauwhede et al. |
| 2001/0046169 A1 | 11/2001 | Morzano |
| 2003/0021136 A1 | 1/2003 | Keeth et al. |
| 2003/0094985 A1 | 5/2003 | Heo et al. |
| 2003/0112047 A1 | 6/2003 | Dike |
| 2005/0246670 A1 | 11/2005 | Bois et al. |
| 2005/0246672 A1 | 11/2005 | Bois et al. |
| 2006/0043537 A1 | 3/2006 | Frank et al. |
| 2007/0057698 A1 | 3/2007 | Verbauwhede et al. |
| 2008/0276214 A1 | 11/2008 | Bartley et al. |

OTHER PUBLICATIONS

Ruiz G A et al., "Compact 32-Bit CMOS Adder in Multiple-Output DCVS Logic for Self-Timed Circuits," IEE Proceedings: Circuits Devices and Systems, Institution of Electrical Engineers, Stenvenage, GB, vol. 147, No. 3, Jun. 8, 2000, pp. 183-188.

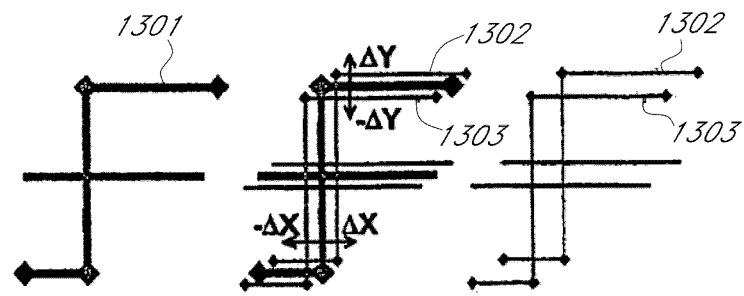
FIG. 13A   FIG. 13B   FIG. 13C
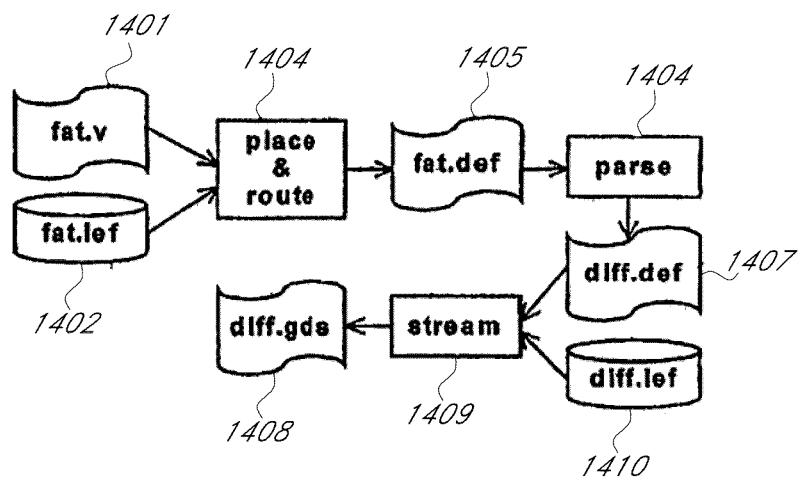
FIG. 14

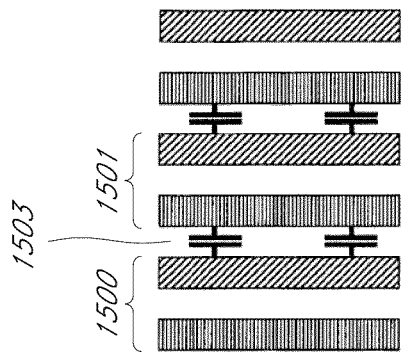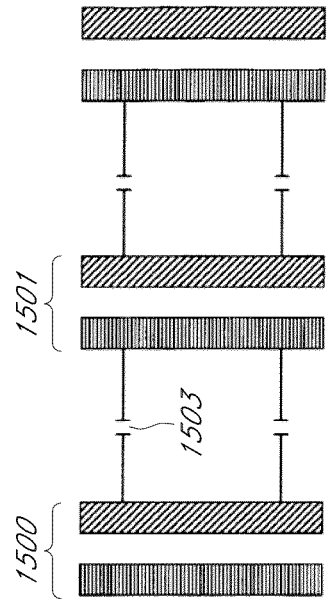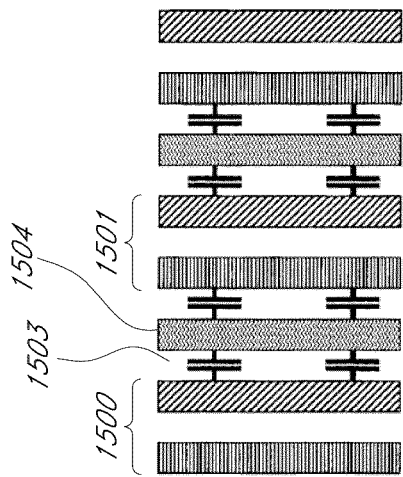

WAVE DYNAMIC DIFFERENTIAL LOGIC

REFERENCE TO RELATED APPLICATIONS

The present application is a continuation of U.S. patent application No. 13/050,317, filed Mar. 17, 2011, which is a divisional of U.S. application No. 10/586,846, filed Jul. 20, 2006, which is a national stage application under 35 U.S.C. §371 of PCT Application No. PCT/US2005/004877, designating the United States, filed on Feb. 11, 2005. The PCT Application was published in English, as WO 2005/081085 on Sep. 1, 2005, and claims priority benefit of U.S. Provisional Application No. 60/544,809, filed Feb. 13, 2004, titled "LOGIC SYSTEM FOR DPA RESISTANCE", and U.S. Provisional Application No. 60/613,059, filed Sep. 24, 2004, titled "MULTIPLE DIFFERENTIAL PAIR ROUTING." Each of the aforementioned applications are hereby incorporated in their entirety by reference herein.

U.S. GOVERNMENT INTEREST STATEMENT

This invention was made with Government support of Grant No. 0098361, awarded by the National Science Foundation. The Government has certain rights in this invention.

BACKGROUND

1. Field of the Invention

The present invention relates to logic systems that are resistant to differential power analysis and other side channel attacks (SCA).

2. Description of the Related Art

When encryption algorithms are implemented on a physical device, the device itself often provides an attacker with important side channel-information to obtain the secret key. For example, Differential Power Analysis (DPA) uses the fact that logic operations have power characteristics that depend on the input data.

DPA has been used against Smart Cards, where the security IC is often easily observable. Smart Cards are used in a broad range of applications. The four main sectors are (1) Telecommunications, e.g. SIM cards in GSM mobile phones; (2) Financial Services, e.g. electronic wallets, ATM and credit cards; (3) Pay TV; and (4) Government/Healthcare, e.g. secure ID cards containing biometric information.

Many countermeasures have been proposed to try and conceal the supply current variations at the architectural or the algorithmic level. Yet, the proposed countermeasures are not effective or practical against DPA and/or its derivatives, as the variations actually originate at the logic level.

SUMMARY

These and other problems are solved by providing DPA-resistant logic circuits. An architecture and methodology are suitable for integration in a common automated EDA design tool flow. The architecture and design methodology can be used in logic circuits, gate arrays, FPGAs, cryptographic processors, etc.

In one embodiment, the implementation details of how to create a secure encryption module can be hidden from the designer. The designer is thus, able to write the code for the design of DPA-resistant logic circuits using the same design techniques used for conventional logic circuits. Contrary to other complicated DPA-blocking techniques, the designer does not need specialized knowledge and understanding of the methodology. In one embodiment, the automated design flow generates a secure design from a Verilog or VHDL netlist. The resulting encryption module has a relatively constant power consumption that does not depend on the input signals and is thus relatively independent of which logic operations are performed. In one embodiment, the present design methodology uses existing resources and as a result can be readily applied. In one embodiment, the architecture and design methodology blocks DPA at the logic level, freeing the designer to concentrate on preventing other side channels at a different level of abstraction (e.g., conditional branching with unequal lengths, etc.)

In one embodiment, a Simple Dynamic Differential Logic (SDDL) is provided, wherein a differential logic stage includes pre-charge or pre-discharge circuits to prevent DPA and SCA. In one embodiment, a Wave Dynamic Differential Logic (WDDL) is provided, wherein a differential logic stage is pre-charged or pre-discharged by a previous logic stage, such as, for example, a previous SDDL stage, a WDDL stage, etc. In one embodiment, a Divided Wave Dynamic Differential Logic (DWDDL) is provided wherein a WDDL circuit is conveniently implemented as dual logic trees.

In one embodiment, a Dynamic and Differential Logic is provided without the disadvantages of (1) having a large load on the pre-charge control signal and (2) low noise margins. In one embodiment, a charge is not stored on a high-impedance node. In one embodiment, static CMOS gates have their output connected to either VDD or GND.

In one embodiment, EDA tools are used to route multiple differential pairs. In one embodiment, each output pair is routed as a "fat" wire, which has among other characteristics the width of two parallel wires plus spacing. Afterwards, the fat wires are split into the two differential lines.

One embodiment includes a method for differential pair conductor routing in a logic circuit, by routing conductors of a first line width to obtain vertical conductors of the first line width, horizontal conductors of the first line width, and vias to connect the vertical conductors and the horizontal conductors, separating at least one of the vertical conductors of the first line width into parallel first and second differential vertical conductors of a second line width, where the second line width is smaller than one-half of the first line width, separating at least one of the horizontal conductors of the first line width into parallel first and second differential horizontal conductors of the second line width, and separating a via connecting the at least one of the vertical conductors to the at least one of the horizontal conductors into first and second vias; the first via connecting the first differential vertical conductor to the first differential horizontal conductor and the second via connecting the second differential vertical conductor to the second differential horizontal conductor. In one embodiment, the first and second vias and/or wires have a substantially equal width. In one embodiment, the first and second vias and/or wires have different widths.

In one embodiment, the method includes replacing conventional logic used for the routing with differential logic. In one embodiment, the method includes doubling a grid pitch. In one embodiment, a centerline of a space between the parallel first and second differential horizontal conductors corresponds to a centerline of the at least one horizontal conductor.

In one embodiment, the routing is provided by an automated software routing tool. In one embodiment, the routing is provided by using Silicon Ensemble from Cadence Software, Inc.

One embodiment includes a method for differential pair conductor routing in a logic circuit, by routing conductors of a first line width to obtain a first routing for a first logic library, wherein vertical and horizontal paths are separated such that vertical and horizontal conductors do not short, wherein connections between the vertical and horizontal paths are provided by vias, separating conductor paths in the first routing into differential paths by splitting the conductors of a first line width into spaced parallel conductors of a second line width, where the second line width is smaller than the first line width, separating the vias into pairs of vias, and replacing the first logic library with a differential logic library. In one embodiment, the first and second vias and/or wires have a substantially equal line width. In one embodiment, the first and second vias and/or wires have different line widths.

BRIEF DESCRIPTION OF THE FIGURES

FIG. 13A shows the "fat" wires.

FIG. 13B shows the translation from "fat" wires to differential wires.

FIG. 13C shows the resulting differential wires.

FIG. 14 shows a differential routing methodology.

FIG. 15A shows capacitive coupling between differential pairs.

FIG. 15B shows reduced capacitive coupling between differential pairs by using power or ground lines as shielding.

FIG. 15C shows reduced capacitive coupling between differential pairs by increasing separation between the pairs.

DESCRIPTION

In one embodiment, a logic-level DPA-resistant architecture and design methodology is provided using standard building blocks to make a new 'compound' library.

Various embodiments of Dynamic and Differential Logic (DDL) are used. A Differential Logic style provides one or more pairs of output signals with opposite logic polarity (e.g., an inverted output and a corresponding non-inverted output of the same logic variable), which for convenience are herein referred to as the true signal and the false signal. In addition to a differential output, the input signals are differential too. In one embodiment, the Dynamic Logic style alternates pre-charge and evaluation phase, in which the output is pre-(dis) charged and conditionally evaluated respectively.

Figure 1:
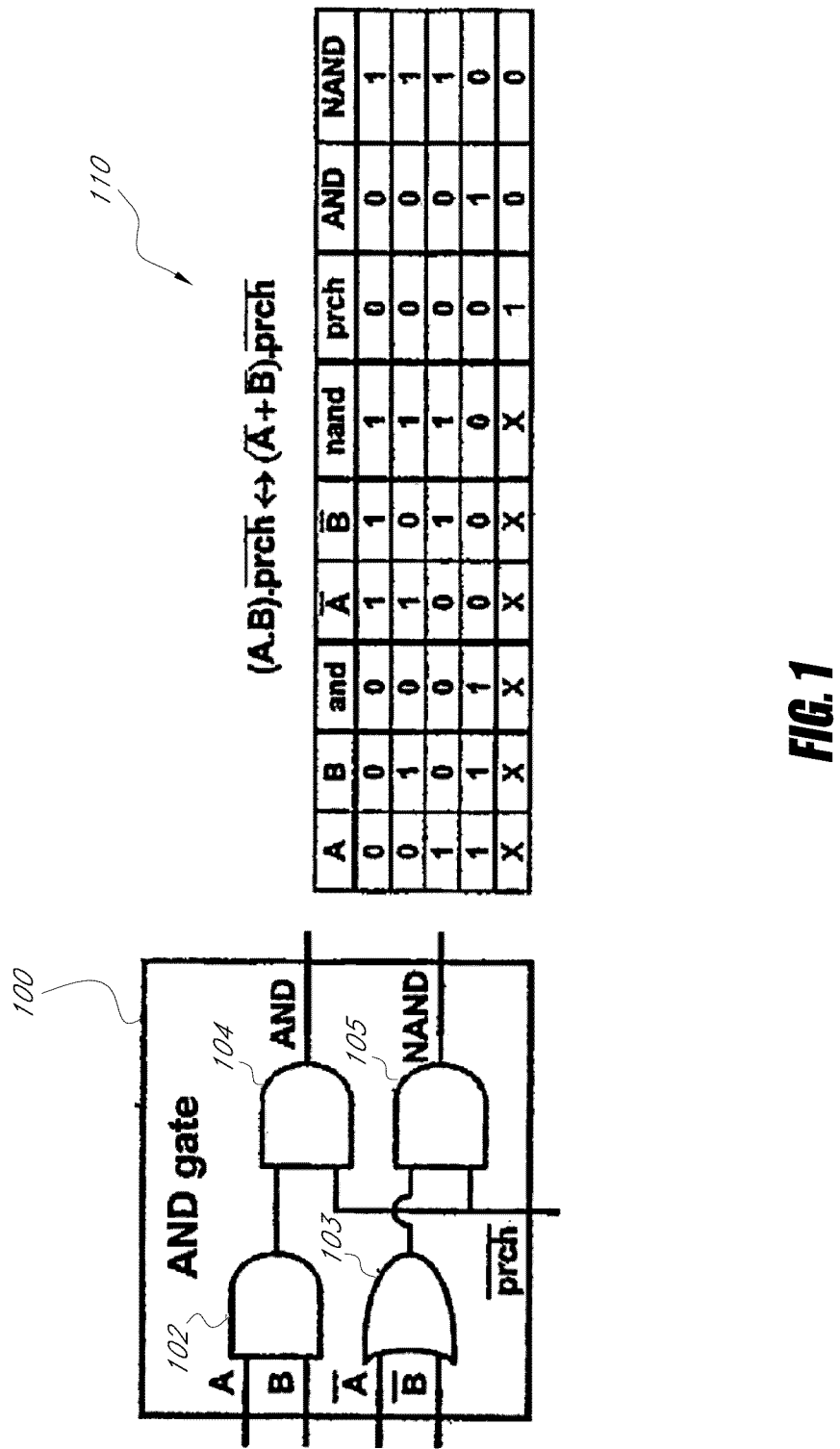
FIG. 1 shows one embodiment of a Simple DDL (SDDL) 2-input AND gate.

FIG. 1 shows one embodiment of a Simple DDL (SDDL) 2-input AND gate 100. In the SDDL AND gate 100, inputs A and B are provided to an AND gate 102, and inverted inputs A and B are provided to an OR gate 103. An output of the AND gate 102 is provided to a first input of an AND gate 104, and an output of the OR gate 103 is provided to a first input of a NAND gate 105. An inverted precharge input prch is provided to respective second inputs of the AND gate 104 and the NAND gate 105. (Note, for convenience, in the present disclosure, an underscore is used to denote inversion rather than the more conventional overscore.) An output of the AND gate 104 corresponds to an uninverted (normal) output of the gate 100 and an output of the NAND gate 105 corresponds to an inverted output of the gate 100.

Creating a compound standard cell, which has a dynamic differential behavior, is done with the help of: (1) the De-Morgan's Law, which allows expressing the false output of any logic function, using the false inputs of the original logic function; and (2) AND-ing the differential output with a precharge signal. Because of the AND-ing with the pre-charge signal, whenever the pre-charge signal is "1", the inverted prch signal is "0" as shown in FIG. 1 and the outputs are pre-discharged to "0" independently of the input-values. On the other hand, whenever the pre-charge signal is "0", exactly one output, which is specified by the inputs, will evaluate to "1". For example, FIG. 1 shows one embodiment of a Simple DDL (SDDL) 2-input AND-gate 100. This methodology can be applied to standard logic functions such as, for example, OR, AND, NOR, NAND, XOR, and the like in a logic cell or FGPA slice, etc. FIG. 1 shows a SDDL AND gate with pre-'dis'-charge logic where the outputs are pre-discharged to zero by AND-ing the outputs with the inverted prch signal.

Figure 2:
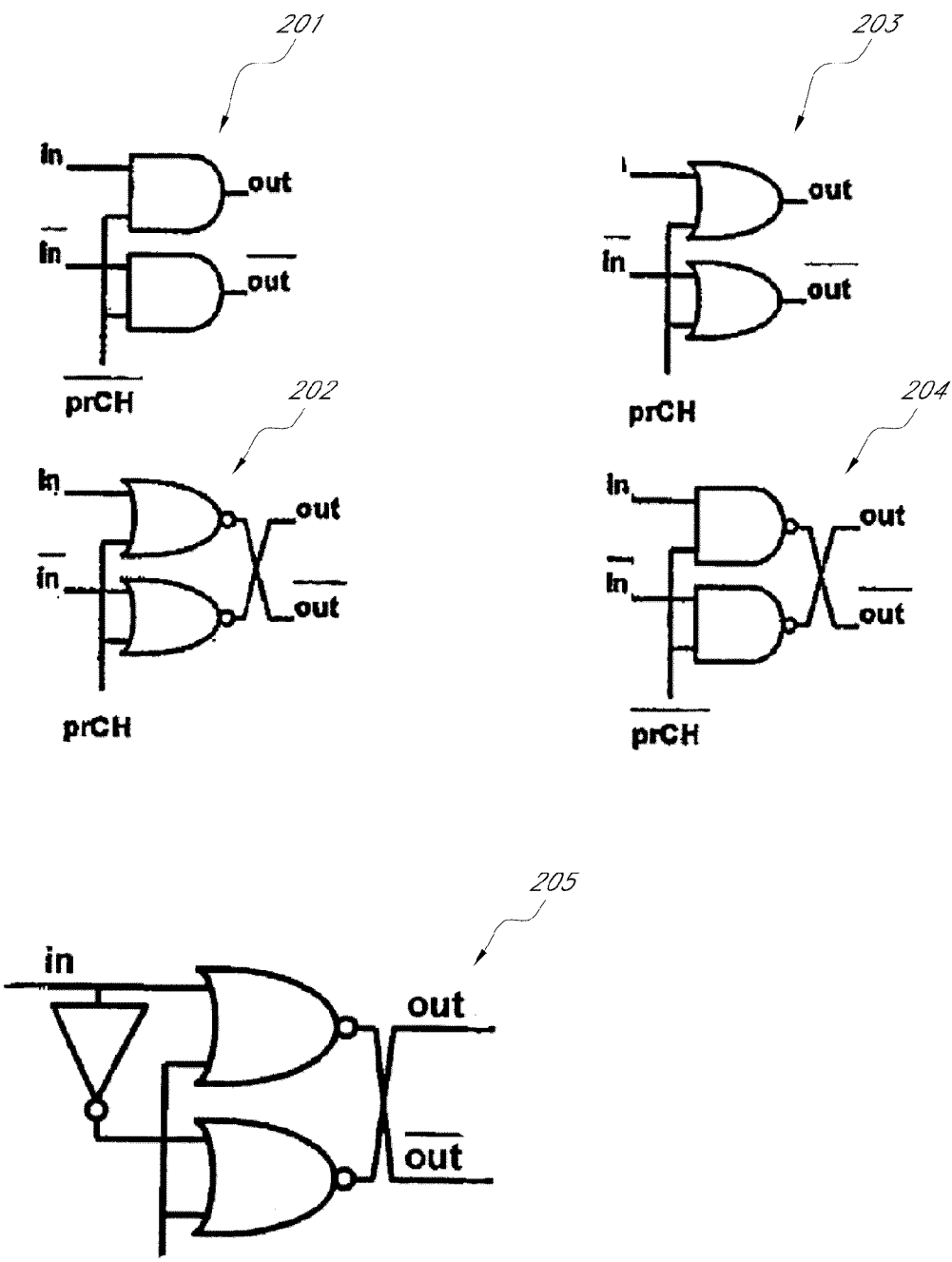
FIG. 2 shows embodiments of an SDDL precharge and predischarge operator.

FIG. 2 shows various embodiments 201-205 of applying the precharge signal prch in SDDL logic gates. In a first embodiment 201, an input in is provided to a first input of a first AND gate and an inverted input in is provided a first input of a second AND gate. The signal prch is provided to respective second inputs of the first and second AND gates. The first AND gate provides an output out, and the second AND gate provides an inverted output out. One of ordinary skill in the art will recognize that the precharge/predischarge operation can be implemented in many ways, and the embodiments in the figures are not intended to be limiting.

In a second embodiment 202, an input in is provided to a first input of a first NOR gate and an inverted input in is provided a first input of a second NOR gate. The signal prch is provided to respective second inputs of the first and second NOR gates. The second NOR gate provides an output out, and the first NOR gate provides an inverted output out.

In a third embodiment 203, an input in is provided to a first input of a first OR gate and an inverted input in is provided a first input of a second OR gate. The signal prch is provided to respective second inputs of the first and second OR gates. The first OR gate provides an output out, and the second OR gate provides an inverted output out.

In a fourth embodiment 204, an input in is provided to a first input of a first NAND gate and an inverted input in is provided a first input of a second NAND gate. The signal prch is provided to respective second inputs of the first and second NOR gates. The second NAND gate provides an output out, and the first NAND gate provides an inverted output out.

A fifth embodiment 205 shows the embodiment 202 where a single-ended input is converted to a double-ended input by using an inverter. One of ordinary skill in the art will recognize that this technique for generating a double-ended input can also be used in connection with the embodiments 201, 203 and 204, as well as other embodiments.

As shown in FIG. 2, building pre-charge logic, which is logic that pre-charges the outputs to '1', can be done by OR-ing the differential outputs obtained after application of the De-Morgan's law with a pre-charge signal. FIG. 2 (203) shows one embodiment of the OR-ing operation. Static Complementary CMOS logic is inverting logic. As a result, for an ASIC implementation of the SDDL, it is typically useful in terms of area and power consumption to implement the pre-discharge operation as shown in FIG. 2 (202) and the pre-charge operation as shown in FIG. 2 (204).

An SDDL gate can be constructed from any logic function f(x,y,z) by constructing a dual logic function fbar(xbar,ybar, zbar) which calculates the inverse of f(x,y,z) with xbar, ybar and zbar being the inverse of x,y,z respectively. This can be done many ways, one of which is to use De-Morgan's Law to write Fbar(xbar,ybar,zbar)=inv(f(inv(xbar),inv(ybar), inv (zbar)), where inv( )is a logical inversion. A precharge operator/function is attached at the outputs of f and fbar which precharges the outputs with a precharge signal. Example embodiments 201-204 of the precharge operators are shown in FIG. 2. Additionally, to further reduced power signature, the cells/functions can be placed close to each other to equalize the load capacitance. The SDDL can be constructed in a FPGA and standard cells.

Figure 3:
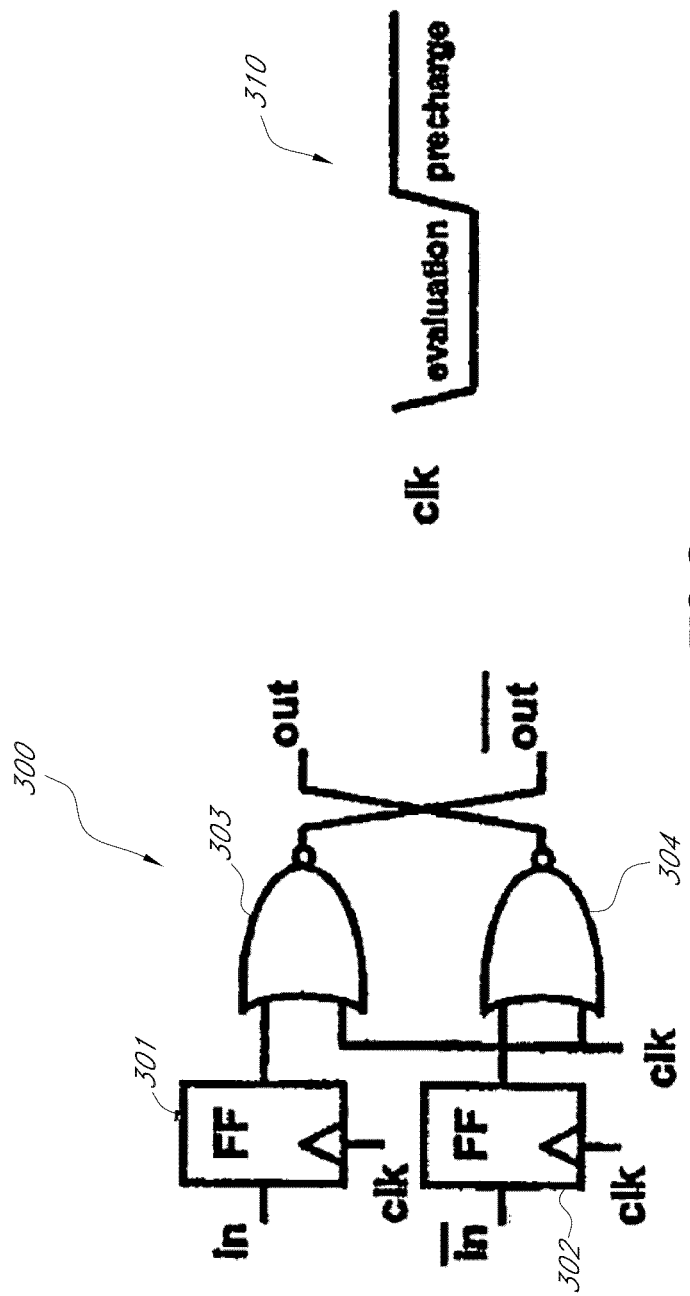
FIG. 3 shows one embodiment of an SDDL register.

FIG. 3 shows one embodiment of an SDDL register 300. In the register 300, an input signal in is provided to a first Flip/Flop (FF) 301, and in is provided to an input of a second FF 302. A clock signal clk is provided to the FF 301 and the FF 302. An output of the FF 301 is provided to a first input of a NOR gate 303, and an output of the FF 302 is provided to a first input of a NOR gate 304. The clk signal is provided to respective second inputs of the NOR gates 303, 304. An output of the NOR gate 304 is an uninverted output out of the register 300, and an output of the NOR gate 303 is an inverted output out of the register 300. As shown in a waveform 310, the clk signal is logic-low during an evaluation phase and logic-high during a precharge phase.

Aside from building logic functions, it is desirable to be able to store a value in a storage register (e.g., a flip-flop memory cell, etc.). FIG. 3 shows a first implementation of an SDDL register 300. One pair of flip-flops in parallel stores the values of the differential true and false inputs. The flip-flops are clocked by the same clock (or by synchronized clocks).

Figure 4:
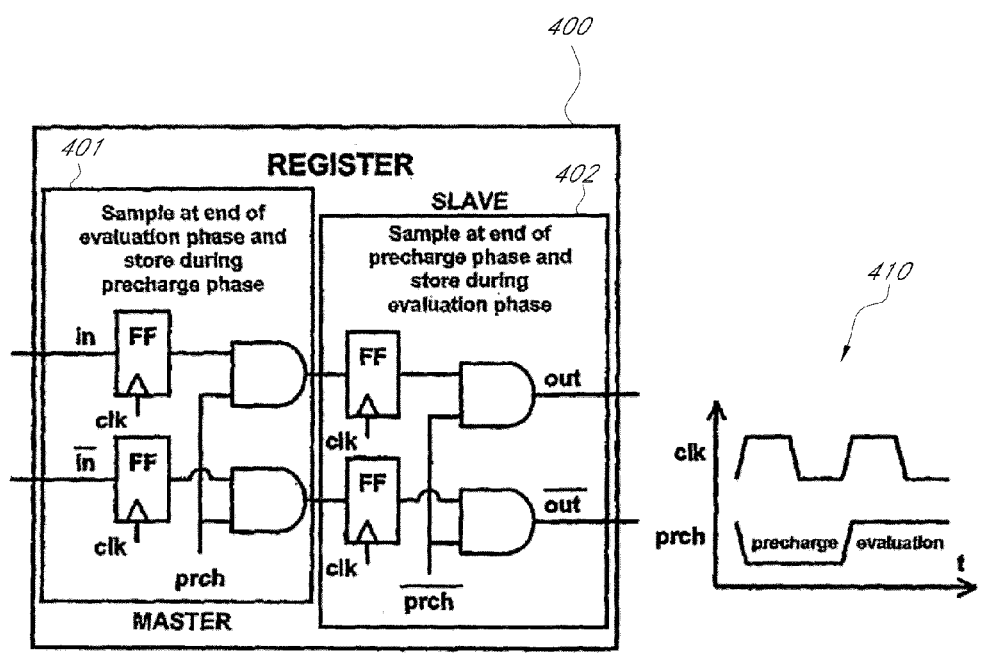
FIG. 4 shows one embodiment of an SDDL register.

FIG. 4 shows one embodiment of a master-slave SDDL memory 400, having a master register 401 and a slave register 402. The registers 401 and 402 are similar to the register 300 shown in FIG. 3 with the NOR gates 302, 303 replaced by AND gates. In the master register 401, where a precharge signal prch is provided to the respective second inputs of the AND gates instead of the clk signal. The inverted and non-inverted outputs of the master register 401 are provided to the respective inverted and non-inverted inputs of the slave register 402. In the master register 401, precharge signal prch is provided to the respective second inputs of the AND gates. In the slave register 402, the inverted precharge signal prch is provided to the respective second inputs of the AND gates. As shown in a timing diagram 410, the clock signal clk operates at twice the frequency of the precharge signal prch. During a first clock cycle, the precharge signal is held at logic low, during a second clock cycle, the precharge signal is held at a logic high.

The register design of FIG. 4 is based on a master-slave concept. Two flip-flop pairs in series store the values of the differential true and false input. The flip-flops are clocked with the same clock. Each flip-flop samples and stores its input at the rising clock edge. The master 401, which is the first parallel flip-flop pair, is pre-charged with the inverted pre-charge signal. The slave 402, which is the second parallel flip-flop pair, is pre-charged with the pre-charge signal. The pre-charge signal is at half the clock frequency.

One of ordinary skill in the art will recognize that the precharge/predischarge operation can be implemented in many ways, and the embodiments in the figures are not intended to be limiting. For example, in one embodiment, the precharge operation can be provided by interchanging the NOR gates of FIG. 3 with the AND gates of FIG. 2 (201) (e.g., by generating pre-charge logic of FIG. 2 (203, 204) instead of pre-discharge logic of FIG. 2 (201, 202). Other examples can be given for FIG. 4, such as, for example, by removing the precharge operator in the slave (which is the last flip-flop pair).

One advantage of the implementation in FIG. 4 is that on each cycle all flip-flops and their internal nodes are reset. As a consequence, on every cycle the same event happens in the SDDL compound register. As compared to FIG. 3, the implementation of FIG. 4 at higher clock frequency for the same throughput has higher power consumption, larger area and larger clock load. Special design rules, like NP-rules or domino logic rules, are not necessary when cascading the gates in order to build combinatorial logic. Compound standard cells can be interconnected. However, there is typically no guarantee that each compound gate has only one switching event per cycle. This is easily seen with an example as shown in FIG. 5.

Figure 5:
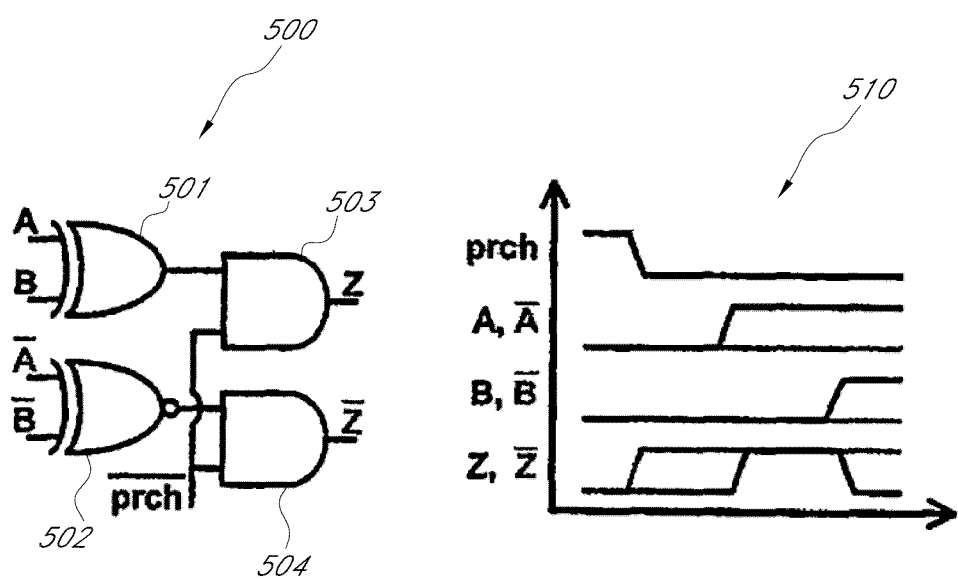
FIG. 5 shows that both signals of the differential output have a switching event, even though the differential inputs each have only one switching event.

FIG. 5 shows that both signals of the differential output of a gate 500 have a switching event, even though the differential inputs each have only one switching event. In FIG. 5, inputs A and B are provided to an exclusive-or (XOR) gate 501 and inverted inputs A and B are provided to inputs of an exclusive-nor (XNOR) gate 502. An output of the gate 501 is provided to a first input of an AND gate 503, and an output of the gate 502 is provided to a first input of an AND gate 504. The inverted precharge signal prch is provided to respective second inputs of the AND gates 503, 504. The output of the AND gate 503 is an output Z and the output of the AND gate 504 is an output Z.

The timing diagram of FIG. 5 shows that both signals of the differential output have a switching event, even though the differential inputs each have only one switching event. Note that both the timing and the values of the inputs will influence the number of switching events. In a large circuit, the glitches propagate to other gates and the number of switching events is undefined, as is the power consumption.

One of ordinary skill in the art will recognize that vulnerability to DPA attacks is reduced by designing logic having a switching factor relatively close to 100%, as described herein, wherein during each cycle a relatively constant capacitance is charged or discharged.

Wave Dynamic Differential Logic (WDDL)

Any logic function in Boolean algebra can be expressed with only three operators, namely, the "invert", "AND" and "OR" operators. The OR and AND operators are dual operators: applying DeMorgan's law on one operator will result in the other operator. An inverter is redundant in differential logic because differential logic has both the true and the false output. Thus there is no need for an inverter, as inversion is simply implemented by exchanging the outputs. Restricting the problem to the conception of a secure version of the AND- and OR-operator has several advantages.

Figure 6:
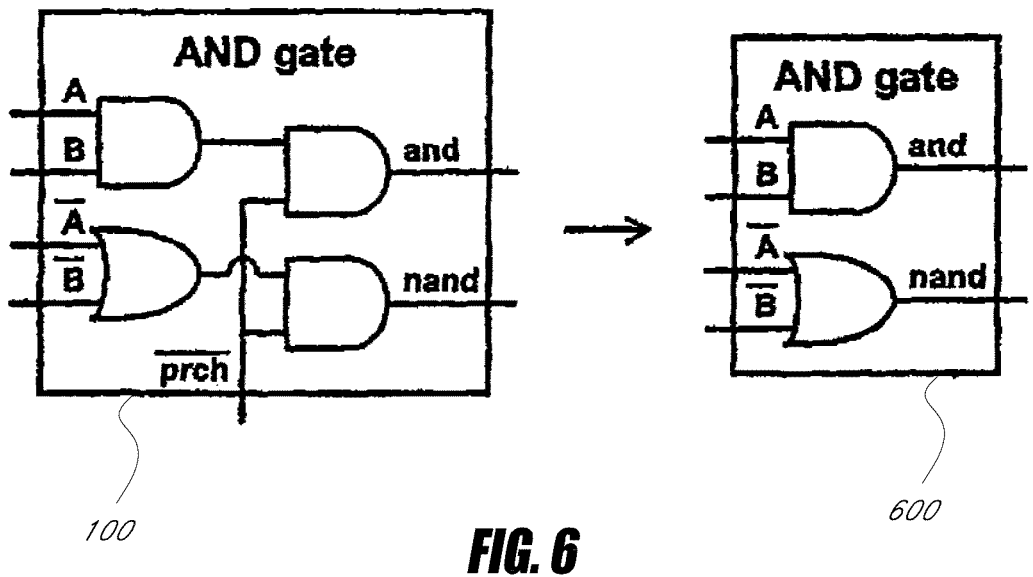
FIG. 6 shows the 2-input SDDL AND-gate, the truth table of the SDDL AND-gate, and the final 2-input WDDL AND-gate implementation.

FIG. 6 shows the 2-input SDDL AND-gate 100, the truth table of the SDDL AND-gate 610, and the final 2-input WDDL AND gate 600.

The differential input signals, which are the outputs of preceding dynamic gates, pre-charge to '0'. As a result, whenever the inputs of an any-input AND-gate or an any-input OR-gate are pre-charged to '0', the output signals are automatically at '0'. There is no need to force the output signals to '0'. Consequently, performing the predischarge operation inside the SDDL any-input AND-gate and the SDDL any-input OR-gate is redundant and can be omitted. As an example, FIG. 6 shows the truth table 610 of the 2-input SDDL AND-gate 100. The table shows that whenever the input signals are predischarged to '0', the differential output signals are at '0'. FIG. 6 also shows the final 2-input WDDL AND-gate 600. This methodology can be applied to all any-input AND- and OR-gates of a standard cell library or within a slice on an FPGA. Although described above in terms of a pre-discharge, one of ordinary skill in the art will recognize that the system can also be configured to precharge to 1 and transmit the precharge 1 to the next gate.

In WDDL, the function f (described above in connection with SDDL) is constructed using non-inverting dual operators, such as, for example, AND and OR operators. Additionally, the input signals can be inverted (as, for example, in an XOR gate) and/or the output signals can be inverted. This allows the gate to pass on the precharge wave to the next gate. Since each gate passes on the precharge wave. The precharge operators at f and fbar can be omitted. The precharge wave can be generated at the inputs and propagate by master slave flipflops without precharge (or master slave flipflops with precharge), or at the inputs and at each flip-flop by using the flipflop 300.

Special design rules, like NP-rules or domino logic rules, are not necessary when cascading the gates in order to build combinatorial logic. Compound standard cells can be interconnected. It can be shown, that every compound WDDL gate in the combinatorial logic tree has only 1 switching event per cycle. The pre-charged '0's will ripple through the combinatorial logic. In other words, instead of a pre-charge signal that resets the logic, there is a pre-charge wave: hence the name Wave Dynamic Differential Logic (WDDL). WDDL provides a Dynamic and Differential Logic without the disadvantage of having a large load on the pre-charge control signal. The gates are pre-charged without distributing the pre-charge signal to each individual gate.

Figure 7:
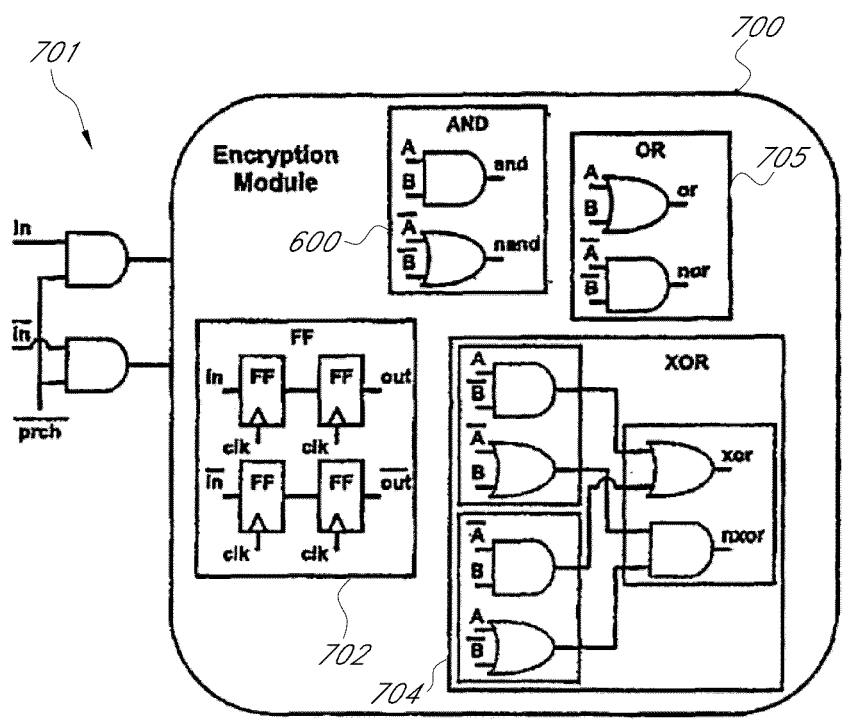
FIG. 7 shows the Master-Slave WDDL register.

There are various ways to launch the pre-charge wave. The first method is to insert the pre-charge operator at the beginning of every combinatorial logic tree, i.e., at all inputs of the encryption module and at the outputs of all registers, as is automatically done by using the registers presented in FIG. 3 and FIG. 4. The second method is shown in FIG. 7. FIG. 7 shows a pre-charge operator 701 that launches a pre-charge wave to a WDDL logic block 700.

It is sufficient to pre-charge the input signals of the complete encryption module such that they alternate between pre-charged zeros and actual logic values. A prerequisite is that Master-Slave WDDL registers are used. The Master-Slave WDDL register, which is depicted as FF in FIG. 7, is the SDDL register presented in FIG. 4 without the pre-charge operation. Once the pre-charged signals have propagated, the encryption module is in stable operation mode. From then on, the registers will launch the pre-charge wave since they store the pre-charged zeros, sampled at the end of the preceding pre-charge phase, during the evaluation phase. Feedback and/or feedforward can be provided in the pipeline, the input signals and the combinatorial logic concurrently interleave pre-charge mode and evaluation mode.

Divided Wave Dynamic Differential Logic (DWDDL)

Figure 8:
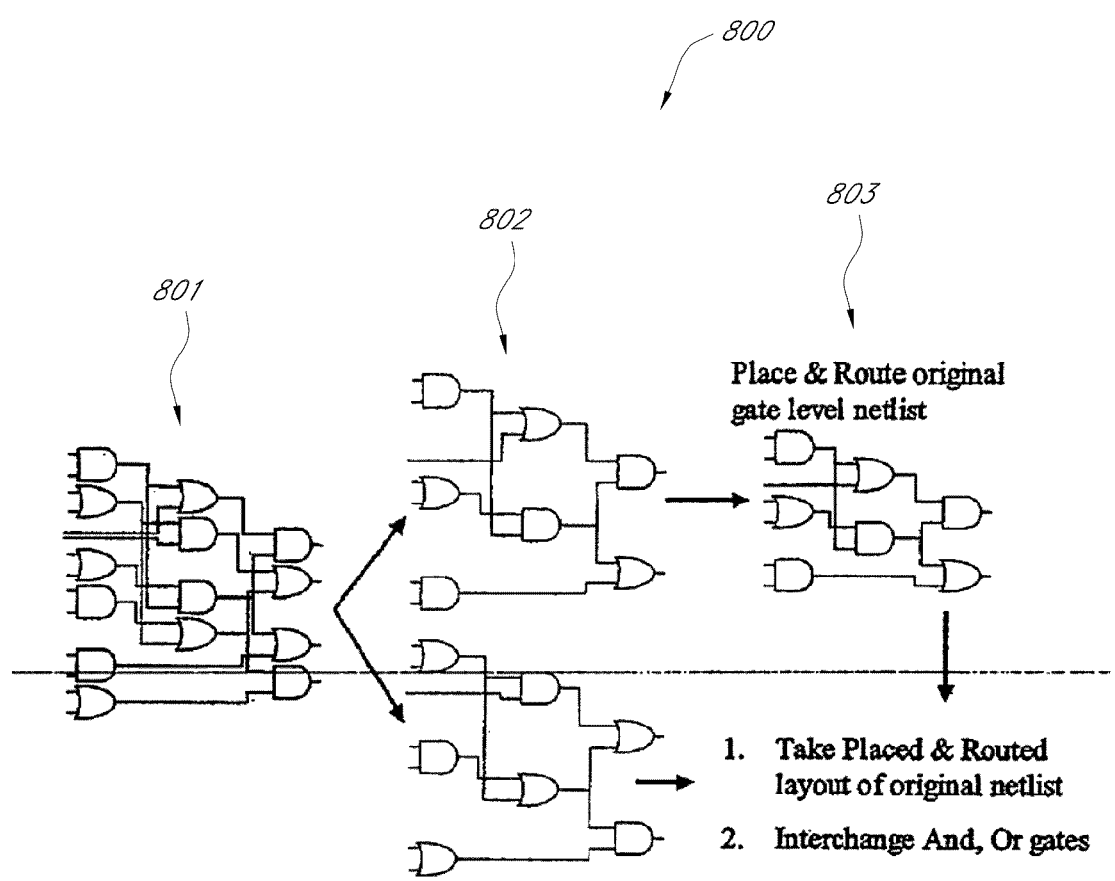
FIG. 8 shows one embodiment of a WDDL implementation of a combinatorial logic tree.

FIG. 8 shows one embodiment of a WDDL implementation 801 of a combinatorial logic tree. When an inversion is not present in the original single-ended combinatorial logic tree, the WDDL tree can be implemented as two logic trees 802, as shown in FIG. 8. These two logic trees 802 are dual, which means that one logic tree can be derived from the other by inverting the inputs and by replacing the single ended AND-gates by single ended OR-gates and the single ended OR-gates by single ended AND-gates, etc. One logic tree generates the true outputs while the other logic tree the false outputs.

In one embodiment shown in FIG. 8, it is possible to place and route the original gate level netlist and subsequently take this layout and interchange the AND- and OR-gates in order to make the dual logic tree. The combination of the two single ended combinatorial logic trees, called a Divided Wave Dynamic Differential Logic (DWDDL), has the same behavior as the original WDDL.

This approach is convenient in that inside the combinatorial logic tree interconnects can be routed in the same environment. The true and the false signal both see the 'same' environment even though they are physically not routed in the same environment. A further advantage is that the step of generating compound standard cells of the logic gates is avoided. It is still desirable to match the interconnects of the inputs to the combinatorial logic tree and to generate compound standard cells for the registers. In DWDDL, inversions inside a combinatorial logic tree are an issue. The inversion halts the pre-charge wave: the '0' at the input of the inverter is propagated as a '1' at the output of the inverter. One solution is to leave the inversion in the combinatorial logic but to insert a pre-charge operation after the inverter. This approach however, has a switching factor higher than 100%. This is shown by an example in FIG. 9.

Figure 9:
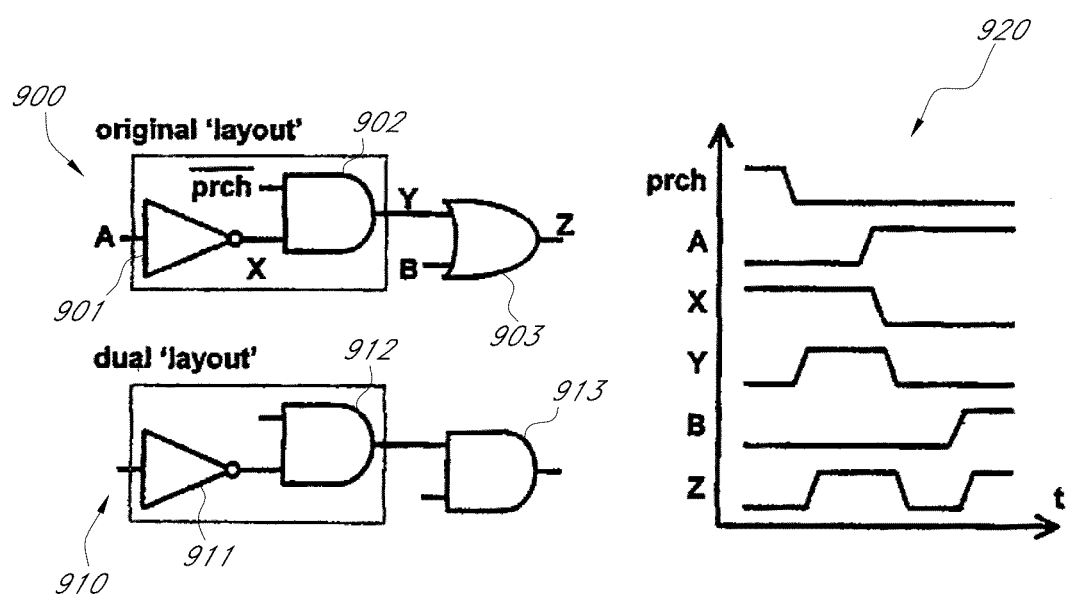
FIG. 9 shows that the output Z of the example circuit has 2 switching events even though the inputs A and B both have only one switching event.

FIG. 9 shows that the output Z of the example circuit 900 has two switching events even though the inputs A and B both have only one switching event. In FIG. 9, an input A of an "original" layout 900 is provided to an input of an inverter 901. An output of the inverter 901 is provided to a first input of an AND gate 902. The inverted precharge signal prch is provide to a second input of the AND gate 902. An output of the AND gate 902 is provided to a first input of an OR gate 903 and the B input is provided to a second input of the OR gate 903. An output of the OR gate 903 is a signal Z.

FIG. 9 also shows a dual layout 910. The dual layout 910 is a dual of the "original" layout 900. In the dual layout 910, the input A of the "original" layout 900 is provided to an input of an inverter 911. An output of the inverter 911 is provided to a first input of an AND gate 912. The precharge signal prch is provided to a second input of the AND gate 912. An output of the AND gate 912 is provided to a first input of an AND gate 913 and the B input is provided to a second input of the AND gate 913. An output of the AND gate 913 is the signal Z.

The timing diagram of FIG. 9 shows that the output Z of the example circuit has two switching events, even though the inputs A and B both have only one switching event. Note that both the timing and the values of the A and B inputs will influence the number of switching events. In a large circuit, the glitches propagate to other gates and the number of switching events is undefined.

Figure 10:
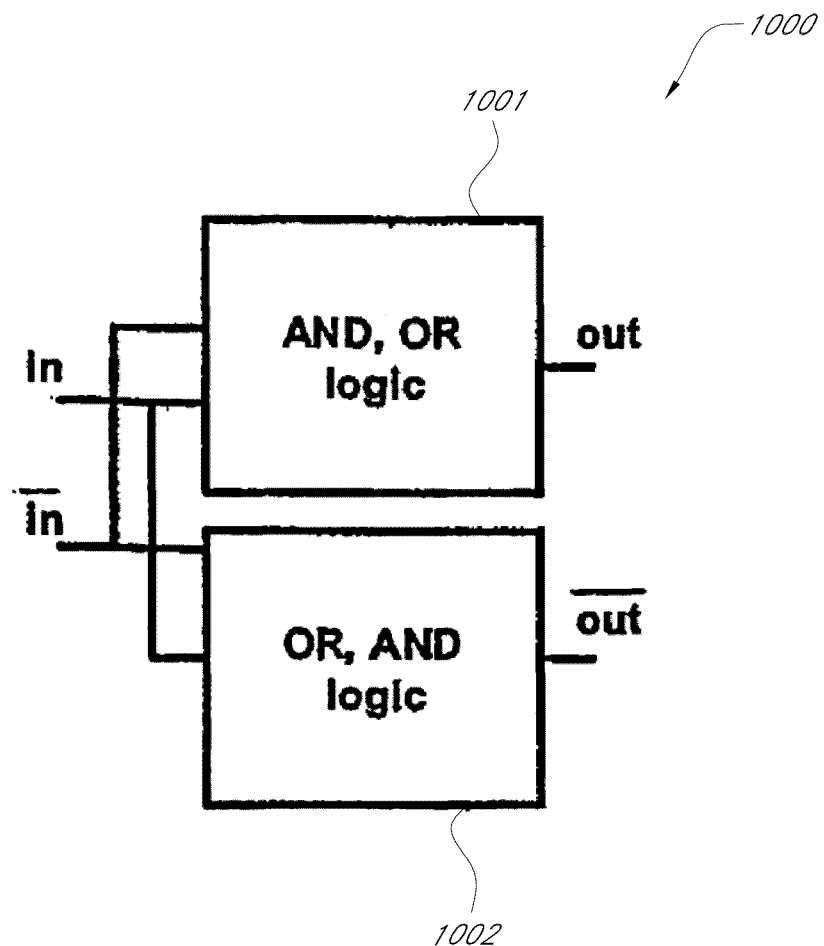
FIG. 10 shows an alternate logic system to provide the true and the false input at the original single-ended combinatorial logic.

FIG. 10 shows an alternate solution to the inversion issue in a system 1000 to provide the true and the false input at the original single-ended combinatorial logic. In the system 1000, normal (uninverted) and inverted inputs are provided to an AND/OR logic block 1001 and to a complementary OR/AND logic block 1002. The logic block 1001 provides an uninverted output and the complementary logic block 1002 provides an inverted output. In the system 1000, the combinatorial logic can be implemented without further inversions. The single-ended combinatorial logic tree can be synthesized and optimized as multilevel logic. It can also be implemented as a Programmable Logic Array. NOR-NOR PLAs and NAND-NAND PLAs can be used. These implementations have a switching factor of 100% despite the inversions.

Figure 11:
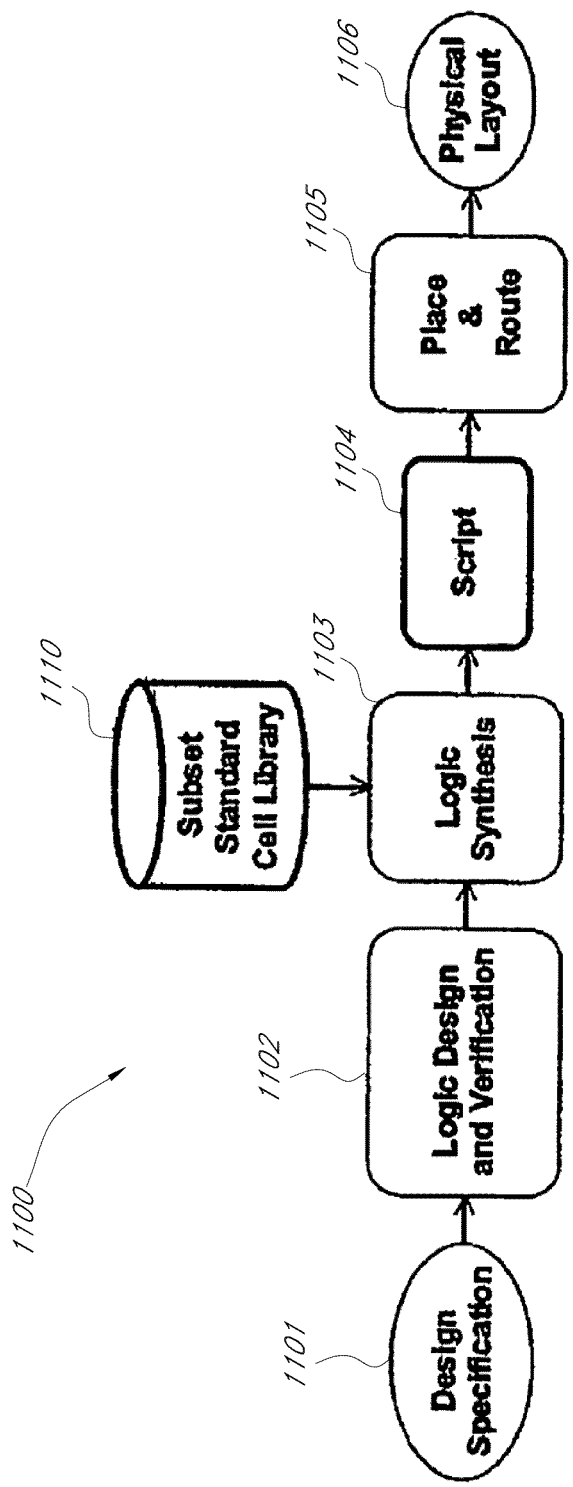
FIG. 11 shows one embodiment of a design flow for DPA-resistant logic.

FIG. 11 shows an embodiment of a design flow 1100 that begins with a design specification 1101. The design specification 1101 is provided to a logic design and verification operation 1102. Data from the logic design and verification operation 1102 and data from a standard cell library 1110 are provided to a logic synthesis module 1103. Logic circuits from the logic synthesis module 1103 are provided to a place and route module 1105. The place and route module 1105 produces a physical layout specification 1106.

FIG. 11 shows one embodiment of a design flow. In synchronous logic, the logic design of a module can be done with a standard hardware description language, such as Verilog or VHDL. Synthesis is done using a subset of a regular static CMOS standard cell library 1110. The subset includes the inverter, AND-gate, OR-gate and a register. A more extended library can also be used both for ASIC and FPGA. Subsequently, script 1104, e.g., in PERL or AWK, transforms the resulting synthesized code at gate level to a code that reflects the differential gates. The script 1104 replaces the single ended gates with the differential dynamic gates, removes the inverters and establishes the right connections. Next the single ended gates are put together to form the compound standard cells. Then these cells can be placed by the placement-tool as ordinary single ended cells. At the end, the most difficult task is for the router-tool 1105, which matches the two output lines of each compound gate. In one prototype, a Xilinx Virtex-II Development Kit by Avnet Design Services is used in connection with the following software tools: DesignAnalyzer from Synopsys, ISE from Xilinx and ModelSim from Mentor Graphics.

In an FPGA implementation of DPA-proof combinatorial logic, more than one compound gate can be implemented in one slice. A restricted combination of several compound logic gates will result in a new compound logic gate that mimics the behavior of a SABL gate. This practice will decrease the area and timing requirements.

One of ordinary skill in the art will recognize that the architectures and methodologies described herein can be implemented using existing standard cell libraries and existing software tools, and can be integrated in a common automated design flow. Being able to apply the methodology on an FPGA opens the door to do secure prototyping of a design on a single FPGA, or even to add an FPGA module on a Smart Card, which will extend the lifespan and increase the versatility of a particular Smart Card product.

For CMOS logic, the power supply variations exploited by DPA depend on the load capacitance that is charged and discharged during operation of the logic circuit. The load capacitance has four components: the internal node capacitance; the intrinsic output capacitance; the interconnect capacitance; and the intrinsic input capacitance of the load. In case of an ASIC with static complementary CMOS standard cells, the internal node capacitances are typically different, as are the intrinsic input and output capacitances. With shrinking channel-length of the transistors, however, the interconnect capacitance becomes the dominant capacitance. This makes it appropriate to concentrate on the interconnect capacitances. Under the assumption that the differential signals travel in the same environment, the interconnect capacitances are equivalent.

In case of an FPGA, it typically depends on the implementation of the look-up table. For example, for the Virtex-II platform, the manufacturer states in the datasheets that the propagation delay is independent of the function implemented. This implies that the internal and the intrinsic capacitances are more or less identical. For other FPGA platforms this may or may not be the case. Here, it can be difficult to force the router-tool to route the signals in the same environment. The reason is that only a limited number of routing tracks may be available.

WDDL is not restricted to only AND and OR gates. For FPGA, different compound gates can be combined in one slice. A combination of a compound gate also results in a secure compound gate. In other words, any combination of non-inverting gates (e.g., AND and OR gates) and its dual will behave as a WDDL gate. Therefore, a design can be synthesized with an extended library. This library contains all the AND, NAND, OR, NOR, AOI, OAI, XOR, MX, BUF, DLY, etc., of the original standard cell library.

A WDDL gate includes of a parallel combination of two positive complementary gates. A positive gate produces a zero output for an all-zero input. A complementary (or dual) gate computes the false output of the original logic gate using the false inputs of the original gate.

Any combination of AND-, OR- operators and its dual, which is constructed with the help of the De-Morgan's law (where the AND and OR operators are interchanged and the input signals are inverted), will behave as a WDDL gate. The resulting compound gate (1) is differential as it is constructed to be; (2) propagates the precharge wave since positive operators are used; and (3) has an approximately 100% switching factor as it is a dual gate with AND and OR operators. AOI (AND-OR-INVERT), XOR, MUX, etc. can all be implemented.

Figure 12A:
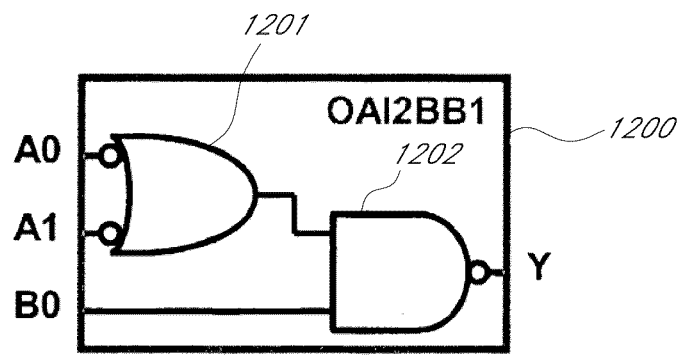
FIG. 12A shows an example single-ended logic function.

FIG. 12A shows an example of a sample logic function 1200 with inputs A0, A1, B0, and a single-ended output Y. The inputs A0 and A1 are provided to respective input of a two-input NAND gate 1201. An output of the NAND gate 1201 is provided to a first input of a NAND gate 1202. The input B0 is provided to a second input of the NAND gate 1201. An output of the NAND gate 1202 is the output Y.

Figure 12B:
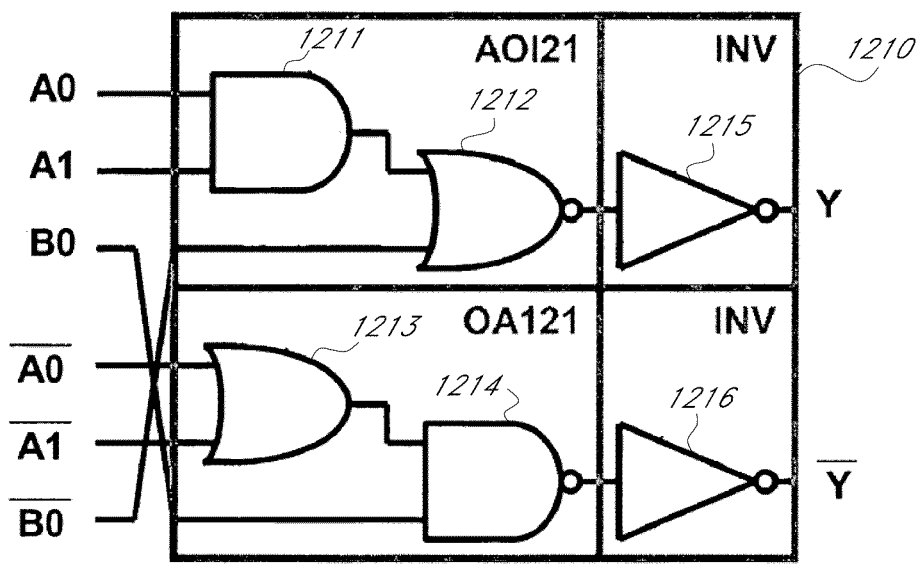
FIG. 12B shows one embodiment of the logic function of FIG. 12A implemented as WDDL logic.

FIG. 12B shows one embodiment of a WDDL implementation 1210 of the logic function 1200 shown in FIG. 12A. In FIG. 12B, the inputs A0 and A1 are provided to respective input of a two-input AND gate 1211. An output of the AND gate 1211 is provided to a first input of a NOR gate 1212. The input B0 is provided to a second input of the NOR gate 1212. An output of the NOR gate 1212 is provided through an inverter 1215 as the output Y. The inverted inputs A0 and A1 are provided to respective inputs of a two-input OR gate 1213. An output of the OR gate 1213 is provided to a first input of a NAND gate 1214. The input B0 is provided to a second input of the NAND gate 1214. An output of the NAND gate 1214 is provided through an inverter 1216 as the inverted output Y.

A similar strategy can be used to implement the XOR and XNOR combination with only positive gates.

Differential pair and shielded routing has been available through shape-based routers whose antecedents are in the PCB domain, where electrical constraints are historically more dominant. PCB routers have been adapted to IC routing and offer differential-pair or shielded routing options. However, router performance and completion rate degrade rapidly with increasing number of such constraints. In one experiment, an attempt to use Cadence Chip Assembly Router version 11.0.06 to route a differential design required almost 8 hrs in time on a SUN ULTRA 5. The routing did not complete. In comparison, Cadence SiliconEnsemble with the techniques described herein only required 3 CPU seconds to route in one experiment.

In one embodiment, the differential pair is routed as a single representing wire. The differential design is routed with that representing wire and then the representing wire is decomposed into the differential wire. The representing wire is represented such that after transformation in the two differential wires no spacing errors or violations occur. After place and route with the representing wire, the resulting design is transformed into the final differential design. The transformation includes two translations of the representing wire and a width definition of each of the 2 differential wires.

The representing wires are routed using gates in which the output pins and input pins represent the differential output pins and input pins of the differential gates. When the representing wires are split into differential pairs, the representing input and output pins of the differential logic standard cells are replaced by corresponding pairs of pins whose locations in the standard cells correspond to the transformation of the representing wire into the differential pairs.

In one embodiment, the differential pair is routed as a single "fat" wire 1301 as shown in FIG. 13*a*. The differential design is routed with the fat wire 1301 and then the fat wire 1301 is decomposed into the differential wires 1302, 1303 as shown in FIG. 13*b*. The fat wire 1301 is then omitted as shown in FIG. 13*c*. In one embodiment, the line width of the fat wire 1301 covers the space occupied by the two differential wires 1302, 1303. The centerline of the fat wire 1301 is the centerline between the two differential wires 1302, 1303. The width of the fat wire $W_f$ is set by the summation of the pitch $P_n$ of the normal wires and two times half the width of the normal wire $W_n$: $W_f = P_n + 2W_n/2$. The pitch, which is the distance between the centerline of two adjacent wires, $P_f$ of the fat wires is set by the summation of 2 times half the width of the fat wire and the desirable distance $\Delta$ between the fat wires: $P_f = 2W_f/2 + \Delta$. The distance A can be made relatively large to reduce cross-talk effects. The minimum spacing rules do not change. After place & route with the fat wire, the resulting design is transformed into the final differential design. The transformation includes two translations of the fat wire and a width reduction to the normal width. In one embodiment, the differential wires 1302, 1303 are the same line width. In one embodiment, the differential wires 1302, 1303 are different line widths.

Since the centerline between two normal wires is typically the centerline of the fat wire 1301, a translation of the fat wire in the positive direction will result in one differential line and a negative translation in the in the other line. The translation occurs both in the horizontal and the vertical direction. FIGS. 13A-C show the fat wires (A), translation operation (B), and differential routes (C). As shown in FIGS. 13A-C, a consistent shift of all segments of the fat wire with a $\Delta X$ in the X direction and a $\Delta Y$ in the Y direction will result in one wire; a shift with a $-\Delta X$ and a $-\Delta Y$ in the other wire. The shifts $\Delta X$ and $\Delta Y$ are half the pitch lengths of the normal wires in the X and Y direction. Note that $\Delta X$ and $\Delta Y$ can be negative. For example, in one embodiment, $\Delta X$ is a negative offset and $\Delta Y$ is a positive offset.

The resulting differential wires 1302, 1303 have the same number of vias and segments. Each segment has the same length in both wires and is routed over the same number of wires in the other metal layers. As a result, both lines have the same distributed resistances and parasitic capacitances to the substrate and to the routes in the other metal layers.

As can be seen in FIGS. 13A-C, the vias are aligned on a positive tilted diagonal. The input and output pins of the standard cells are also be aligned likewise and with the same offsets. The upper pin is the pin associated with the true net, the lower with the false net. This allows the translation to be done in a consistent way. This also means that the standard cells are placed in the RO direction, otherwise this rule is violated. In one embodiment, allowing different cell orientations provides smaller wire length and smaller area, but the fat wire splitting is more complicated.

In one embodiment, the fat wires are routed using gates in which the output pins and input pins are fat. When the fat wires are split into differential pairs, the fat input and output pins of the differential logic standard cells are replaced by corresponding pairs of pins whose locations in the standard cells correspond to the transformation of the fat wire into the differential pairs. In some embodiments, it is not possible to include the exact differential pin information in the abstract views of the fat gates. However, access direction to the fat pin can be limited by defining appropriate obstructions such that the wire split does not induce any violations.

If the fat wire 1301 takes a turn in one metal layer, the wires of a differential route may cross in the same metal layer and result in an electric short between both wires. This can not happen if each metal layer is only routed in a preferred direction, e.g., only in the vertical direction or only in the horizontal direction. In one embodiment, allowing wrong way routing and turns in one layer provides smaller wire length and smaller area, but the fat wire splitting is more complicated.

In one embodiment, the differential pair is routed as a single representing wire. The representing wire is routed on a large grid that has been defined such that there will be no spacing violations after splitting. Doubling the original grid pitches results in such a grid. After place & route with the representing wire, the resulting design is transformed into the final differential design. The transformation includes two translations of the representing wire and a width definition of each of the two differential wires.

In one embodiment, the grid and the standard cells are defined as follows:

(1) the horizontal and vertical pitches of the fat grid are double that of the normal grid; and (2) the normal and fat grids have an offset of half their pitch length in both the horizontal and vertical direction. With this definition: (1) the standard cell dimensions are multiples of the horizontal and vertical pitch of the fat and the normal grid; (2) the fat pins are situated on the crossings of the fat grid, the differential pins on the crossings of the normal one; and (3) the differential pins can obtained by shifting the fat pin with half a pitch length of the normal grid in both the horizontal and vertical direction.

The methods above describe methodologies to route a design where all wires are differential. It is, however, possible to combine single-ended routing and differential routing.

In one embodiment, the design can be routed in two stages as shown in FIG. 14. First the differential lines are routed, and subsequently with a new library database the single ended lines are routed, or vice versa.

In one embodiment, the differential and single-ended wires can be routed concurrently by defining the fat routes or the single ended routes as non-default routing rules. Or, one can route every wire as a fat wire and subsequently transform the single ended signals into a single line and the differential signals into two lines In one embodiment, routing is provided by Silicon Ensemble. The wires in the routed 'fat.def' design file are described as lines between two points and vias are assigned as points. The wire width and via characteristics are defined in the .lef library database. As a result, the parser only needs to translate the (X,Y) coordinates of the end points without worrying about the wire characteristics. The translation is done by (1) repeating each statement that defines a net; (2) attaching the first statement to the positive pins and translating it in a positive (ΔX,ΔY) direction; and (3) attaching the second statement to the negative pins and translate it in a negative (ΔX,ΔY) direction. Recall that ΔX and ΔY are half the pitch lengths of the normal wires in the X and Y direction. Besides the translation of the nets, each fat gate in the 'fat.def' file is substituted by its corresponding differential gate. The transformation procedure includes: (1) parsing the placed and routed fat design to reflect the differential design and (2) reading in the differential library database. The differential 'diff.lef' library database contains the normal grid definition, normal wire definition, normal via definition and the differential gates with differential pin information.

Thus, multiple differential pairs can be routed with the aid of an EDA tool to the lines in parallel and in adjacent tracks such that they have the same parasitic capacitances and resistances. Differential designs are routed with differential pairs almost a factor three faster than when the same differential design is routed regularly without any constraints.

In one experiment, the variation between the capacitance at the true signal net and the capacitance at the corresponding false signal net is up to a factor four for the regular (non-differential) route procedure provided by Silicon Ensemble. By contrast, the differential pair route procedure shows negligible variation in capacitance between the two differential lines. The absolute values of the capacitances on the other hand, are similar between the two routing procedures. The mean energy consumption per clock cycle is 42.72 pJ and 44.21 pJ for the regular route and the differential pair route respectively. The normalized energy deviation, which specifies the absolute range of the variation on the energy consumption per cycle, is 1% for the regular route and 0.7% for the differential pair route. The normalized standard deviation is 0.2% and 0.1% respectively.

The differential pair routing herein can be used as part of a secure digital design flow, supported by EDA tools from verilog/vhdl to layout.

Cross-talk, which is the phenomenon of noise induced on one wire by a signal switching on a neighboring wire, has an effect on the power consumption. Cross-talk effects are caused by the distributed capacitance to relatively nearby wires (e.g., wires in the same or relatively nearby metal layers). Routing the two output nets in parallel already removes the uncertainty of one neighbor: during a switching event one output line switches, and the other output line remains quiet. Uncertainty can be reduced by shielding the differential routes on either side with a VDD or VSS line. Reserving one grid line out of three upfront for a power line reduces the problem to routing two differential lines. Note that the approach of alternating signal lines and quiet power lines can produce predictable interconnect parasitic capacitive couplings. Alternatively, the cross-talk effects can be controlled by increasing the distance between different differential routes. In one embodiment, an iterative design flow can be used to identify and correct mismatches, as shown in FIGS. 15A-15C.

FIG. 15A shows parasitic capacitive coupling 1503 between a differential pair 1500 and a differential pair 1501. FIG. 15B shows that a ground conductor, power conductor, or other conductor 1504 placed between the pairs 1500 and 1501. FIG. 15C shows that the parasitic capacitive coupling 1503 can be reduced by increasing the distance between the pairs 1500 and 1501.

Although the foregoing has been a description and illustration of specific embodiments of the invention, various modifications and changes can be made thereto by persons skilled in the art, without departing from the scope and spirit of the invention as defined by the claims.

What is claimed is:

1. A method of operating a logic circuit, comprising:
during a pre-charge phase associated with a logic tree comprising a plurality of interconnected differential logic gates:
receiving a pre-charge wave at at least first and second inputs of a first differential logic gate of the plurality of interconnected differential logic gates;
propagating the pre-charge wave from the first and second inputs of the first differential logic gate to at least first and second outputs of the first differential logic gate;
receiving the pre-charge wave propagated by the first differential logic gate at at least first and second inputs of a second differential logic gate of the plurality of interconnected differential logic gates, the second differential logic gate subsequent to the first differential logic gate in the logic tree;
propagating the received pre-charge wave from the first and second inputs of the second differential logic gate to at least first and second outputs of the second differential logic gate,
wherein the first and second differential logic gates do not include separate pre-charge signal inputs.

2. The method of claim 1, further comprising, during an evaluation phase associated with the logic tree:
with the first differential logic gate, operating on differential data signals applied to the first and second inputs of the first differential logic gate, wherein the first and second outputs of the first differential logic gate evaluate to first differential values based on a combinatorial logic function implemented by the first differential logic gate, and
with the second differential logic gate, operating on differential data signals applied to the first and second inputs of the second differential logic gate, wherein the first and second outputs of the second differential logic gate evaluate to second differential values based on a combinatorial logic function implemented by the second differential logic gate and based at least in part on the first differential values,
wherein, during the pre-charge phase, the first output of the first differential logic gate is pre-charged to the same value as the second output of the first differential logic gate, and the first output of the second differential logic gate is pre-charged to the same value as the second output of the second differential logic gate.

3. The method of claim 1, further comprising, with at least one clocked register, passing the pre-charge wave from the first logic tree to a second logic tree comprising a second plurality of interconnected differential logic gates, wherein the at least one clocked register does not include a separate pre-charge input.

4. A method of operating a logic circuit, comprising:
during a pre-discharge phase associated with a logic tree comprising a plurality of interconnected differential logic gates:

receiving a pre-discharge wave at at least first and second inputs of a first differential logic gate of the plurality of interconnected differential logic gates;

propagating the pre-discharge wave from the first and second inputs of the first differential logic gate to at least first and second outputs of the first differential logic gate;

receiving the pre-discharge wave propagated by the first differential logic gate at at least first and second inputs of a second differential logic gate of the plurality of interconnected differential logic gates, the second differential logic gate subsequent to the first differential logic gate in the logic tree;

propagating the received pre-discharge wave from the first and second inputs of the second differential logic gate to at least first and second outputs of the second differential logic gate, wherein the first and second differential logic gates do not include separate pre-discharge signal inputs.

5. The method of claim 4, further comprising, during an evaluation phase associated with the logic tree:

with the first differential logic gate, operating on differential data signals applied to the first and second inputs of the first differential logic gate, wherein the first and second outputs of the first differential logic gate evaluate to first differential values based on a combinatorial logic function implemented by the first differential logic gate, and with the second differential logic gate, operating on differential data signals applied to the first and second inputs of the second differential logic gate, wherein the first and second outputs of the second differential logic gate evaluate to second differential values based on a combinatorial logic function implemented by the second differential logic gate and based at least in part on the first differential values, wherein, during the pre-charge phase, the first output of the first differential logic gate is pre-discharged to the same value as the second output of the first differential logic gate, and the first output of the second differential logic gate is pre-discharged to the same value as the second output of the second differential logic gate.

6. The method of claim 4, further comprising, with at least one clocked register, passing the pre-discharge wave from the first logic tree to a second logic tree comprising a second plurality of interconnected differential logic gates, wherein the at least one clocked register does not include a separate pre-discharge input.

7. A logic circuit, comprising:

a logic tree comprising a plurality of interconnected logic gates, the plurality of interconnected differential logic gates comprising:

a first differential logic gate comprising at least first and second inputs and at least first and second outputs, the first differential logic gate configured, during a pre-charge phase associated with the logic tree, to:

receive a pre-charge wave on the first and second inputs of the first differential logic gate; and propagate the received pre-charge wave to the first and second outputs of the first differential logic gate, wherein the first output of the first differential logic gate is pre-charged to the same value as the second output of the first differential logic gate; and a second differential logic gate subsequent to the first differential logic gate in the logic tree, comprising at least first and second inputs and at least first and second outputs, and configured, during the pre-charge phase, to:

receive, on the first and second inputs of the second differential logic gate, the pre-charge wave propagated by the first differential logic gate; and propagate the pre-charge wave to the first and second outputs of the second differential logic gate, wherein the first output of the second differential logic gate is pre-charged to the same value as the second output of the second differential logic gate.

8. The logic circuit of claim 7, wherein the first and second differential logic gates do not include separate pre-charge signal inputs.

9. The logic circuit of claim 7, wherein the first differential logic gate is further configured, during an evaluation phase associated with the logic tree, to operate on differential data signals applied to the first and second inputs of the first differential logic gate, wherein the first and second outputs of the first differential logic gate evaluate to first differential values based on a combinatorial logic function implemented by the first differential logic gate, and the second differential logic gate is further configured, during the evaluation phase, to operate on differential data signals applied to the first and second inputs of the second differential logic gate, wherein the first and second outputs of the second differential logic gate evaluate to second differential values based on a combinatorial logic function implemented by the second differential logic gate and based at least in part on the first differential values.

10. The logic circuit of claim 7, further comprising:

a second logic tree comprising a second plurality of interconnected differential logic gates; and at least one clocked register configured to receive the pre-charge wave after it has propagated through the logic tree, and to pass the received pre-charge wave from the logic tree to the second logic tree, for propagation through the second logic tree, wherein the at least one clocked register does not include a separate pre-charge input.

11. The logic circuit of claim 10, wherein the clocked register is a master-slave register.

12. The logic circuit of claim 7, further comprising at least one clocked register having a separate pre-charge input and configured to initiate the pre-charge wave.

13. The logic circuit of claim 7, wherein the logic circuit resides on a field-programmable gate array (FPGA).

14. The logic circuit of claim 7, wherein the differential logic gates in the plurality of interconnected differential logic gates are constructed using non-inverting dual operators.

15. The logic circuit of claim 7, wherein the logic tree comprises a first single-ended portion and a second single-ended portion, the second single-ended portion comprising a dual of the first single-ended portion, and wherein the gates in the plurality of interconnected differential logic gates are formed from both the first single-ended portion and the single ended dual of the first single-ended portion.

16. A logic circuit, comprising:

a logic tree comprising a plurality of interconnected differential logic gates, the plurality of interconnected differential logic gates comprising:

a first differential logic gate comprising at least first and second inputs and at least first and second outputs, the first differential logic gate configured, during a pre-discharge phase associated with the logic tree, to:

receive a pre-discharge wave on the first and second inputs of the first differential logic gate; and propagate the received pre-discharge wave to the first and second outputs of the first differential logic gate, wherein the first output of the first differential logic gate is pre-discharged to the same value as the second output of the first differential logic gate; and a second differential logic gate subsequent to the first differential logic gate in the logic tree, comprising at least first and second inputs and at least first and second outputs, configured, during the pre-discharge phase, to:

receive on the first and second inputs of the second differential logic gate, the pre-discharge wave propagated by the first differential logic gate; and propagate the pre-discharge wave to the first and second outputs of the second differential logic gate, wherein the first output of the second differential logic gate is pre-discharged to the same value as the second output of the second differential logic gate.

17. The logic circuit of claim 16, wherein the first and second differential logic gates do not include separate pre-discharge signal inputs.

18. The logic circuit of claim 16, wherein the first differential logic gate is further configured, during an evaluation phase associated with the logic tree, to operate on differential data signals applied to the first and second inputs of the first differential logic gate, wherein the first and second outputs of the first differential logic gate evaluate to first differential values based on a combinatorial logic function implemented by the first differential logic gate, and the second differential logic gate is further configured, during the evaluation phase, to operate on differential data signals applied to the first and second inputs of the second differential logic gate, wherein the first and second outputs of the second differential logic gate evaluate to second differential values based on a combinatorial logic function implemented by the second differential logic gate and based at least in part on the first differential values.

19. The logic circuit of claim 16, further comprising:

a second logic tree comprising a second plurality of interconnected differential logic gates; and at least one clocked register configured to receive the pre-discharge wave after it has propagated through the logic tree, and to pass the received pre-discharge wave from the logic tree to the second logic tree, for propagation through the second logic tree, wherein the at least one clocked register does not include a separate pre-discharge input.

20. The logic circuit of claim 19, wherein the clocked register is a master-slave register.

21. The logic circuit of claim 16, further comprising at least one clocked register having a separate pre-discharge input and configured to initiate the pre-discharge wave.

22. The logic circuit of claim 16, wherein the logic circuit resides on a field-programmable gate array (FPGA).

23. The logic circuit of claim 16, wherein the differential logic gates in the plurality of interconnected differential logic gates are constructed using non-inverting dual operators.

24. The logic circuit of claim 16, wherein the logic tree comprises a first single-ended portion and a second single-ended portion, the second single-ended portion comprising a dual of the first single-ended portion, and wherein the gates in the plurality of interconnected differential logic gates are formed from both the first single-ended portion and the single ended dual of the first single-ended portion.

* * * * *